United States Patent [19]

Dorfe et al.

[11] Patent Number: 5,204,669
[45] Date of Patent: Apr. 20, 1993

[54] AUTOMATIC STATION IDENTIFICATION WHERE FUNCTION MODULES AUTOMATICALLY INITIALIZE

[75] Inventors: Steven G. Dorfe, New Hope; James M. Jordan, Eagan, both of Minn.

[73] Assignee: DataCard Corporation, Minnetonka, Minn.

[21] Appl. No.: 575,077

[22] Filed: Aug. 30, 1990

[51] Int. Cl.⁵ .................. G05B 24/02; H04Q 3/00
[52] U.S. Cl. .................... 340/825.52; 340/825.07
[58] Field of Search ................ 340/825.07, 825.08, 340/825.05, 825.52, 825.53; 370/85.8, 92; 364/200 MS File; 361/24

[56] References Cited

U.S. PATENT DOCUMENTS

| | | | |
|---|---|---|---|
| 4,016,639 | 4/1977 | Pederson | 340/825.52 |
| 4,161,634 | 6/1979 | Bellisto | 340/825.52 |
| 4,161,635 | 7/1979 | Wolaver | 179/175.31 R |
| 4,562,535 | 12/1985 | Vincent et al. | 364/200 |
| 4,596,983 | 6/1986 | Sjogren et al. | 340/825.52 |
| 4,626,846 | 12/1986 | Parker et al. | 340/825.52 |
| 4,638,313 | 1/1987 | Sherwood, Jr. et al. | 340/825.52 |
| 4,660,141 | 4/1987 | Ceccon et al. | 364/200 |
| 4,680,583 | 7/1987 | Grover | 340/825.52 |
| 4,682,168 | 7/1987 | Chang et al. | 340/825.65 |
| 4,727,475 | 2/1988 | Kiremidjian | 364/200 |
| 4,750,136 | 6/1988 | Arpin et al. | 364/514 |
| 4,773,005 | 9/1988 | Sullivan | 364/200 |
| 4,817,190 | 3/1989 | Comroe et al. | 340/825.52 |
| 4,939,437 | 7/1990 | Farag et al. | 361/24 |
| 4,947,162 | 8/1990 | Kimura | 340/825.52 |
| 4,982,185 | 1/1991 | Holmberg et al. | 340/825.05 |

*Primary Examiner*—Donald J. Yusko
*Assistant Examiner*—John Giust
*Attorney, Agent, or Firm*—Merchant, Gould, Smith, Edell, Welter & Schmidt

[57] ABSTRACT

The present invention provides a method and apparatus for dynamically assigning addresses and determining the configuration of a plurality of programmable function modules connected to an electrical conductor, such as a serial bus. The programmable function modules are electrically interconnected by a control line in a point-to-point connection between one another. A programmable controller will first transmit an enabling signal on the control line and then will transmit predetermined addressing information on the serial bus. The first function module will then access the serial bus and retrieve the addressing information, assign itself a unique address as determined by the addressing information, modify the addressing information in a predetermined manner, return the modified addressing information to the serial bus, and enable the adjacent function module on the control line. Each function module connected to the serial bus will be assigned an address in a similar fashion. The programmable controller will receive the modified address information from the final function module and will thereby know the number of function modules, the connection sequence of the function modules, and the address of each function module.

14 Claims, 10 Drawing Sheets

AUTOMATIC STATION IDENTIFICATION WHERE FUNCTION MODULES AUTOMATICALLY INITIALIZE

FIELD OF THE INVENTION

This invention relates generally to systems employing a common data bus to provide communication between a programmable controller and a plurality of programmable function modules, also referred to as stations. In particular, the invention is directed to a method and apparatus for dynamically assigning addresses to each programmable function module on the bus and determining the sequence of the function modules on the bus.

BACKGROUND OF THE INVENTION

In any system where a plurality of function modules, also referred to as secondary stations, are interconnected by some sort of electrical communication bus and controlled by a programmable controller, also referred to as a primary station, the programmable controller requires information identifying the modules. This enables the programmable controller to send commands and information to selected modules and to identify the source of information sent by the modules to the programmable controller. This is normally accomplished by assigning a unique address, also referred to as an identifier, to each of the function modules.

One example of such a system is an existing computer system which include an electrical bus structure such as micro-channel, AT bus, etc. Expansion slots are typically present, often eight or more, in the housing containing the computer's motherboard. These expansion slots allow function modules, also referred to a expansion cards, to be electrically interconnected to the computer's bus structure. The central processing unit (CPU) of the computer then identifies each of the function modules in the system.

Yet another example of such a system is an article processing system such as a system for producing data bearing cards. In such a system there are often numerous function modules present. For example, an embosser function module, a magnetic stripe encoder function module, a card inserter function module, a card stacking function module, etc. might be present in one system. These functions may be installed optionally and arranged randomly under the control of a programmable controller. These are but two examples of the numerous systems having a plurality of function modules under the control of a controller.

Typically in a system having multiple function modules, the system might be configured such that different modules might be present or the modules arranged in varying sequences. The programmable controller must be able to identify the modules and their functions and in some systems, such as article processing systems, must be able to identify the physical sequence of the modules along the bus.

In the prior art, the unique static address of each function module is typically established through adjustment of hardware in the device, such as by burning the static address into the read only memory (ROM), or by setting DIP switches or jumper settings. A communication controller in each peripheral device is then programmed to respond only to messages containing addresses matching the number stored in ROM or set by the switches.

The disadvantage of using a ROM in each peripheral device is that the ROM must be different for each device. If, for instance, two embossers are connected to the same bus, the ROM in one embosser must be altered. The use of switches in each module makes it easier for a user to give each module a unique address. However, if there are a large number of modules, this method will require an operator to set a large number of switches. Therefore, this method is prone to operator error.

A further requirement of some multiple module systems, such as systems which process an article, is that the sequence of the modules along the bus must be known. With a modular concept, there could be any number of modules, connected in any order. Moveover, modules might be added or deleted or even have their order changed. The method of burning a static address into the ROM or the method of operators setting DIP switches will not ensure the ability to detect a connection sequence of the modules.

An example of a dynamic address assignment system is described in U.S. Pat. No. 4,773,005 to Sullivan. Each module on the serial bus contains a ROM storing a number representing the modular type. Each module further includes four switches to distinguish between two modules of the same type. The programmable controller then assigns an address as determined by the numbers stored in ROM in combination with the DIP switch setting. While this method achieves dynamic addressing, it is still prone to operator error due to the switch setting on modules of the same type.

What has been needed, therefore, is a dynamic addressing system.

What has been further needed is a dynamic addressing procedure for addressing modules, such that a number of modules may be connected in any order and the order of the modules will be known.

What has been even further needed has been an automatic module addressing system which is totally transparent to the operator and requires no intervention or special installation procedures.

The present invention provides these long felt needs and offers other advantages over the prior art.

SUMMARY OF THE INVENTION

To overcome the limitations in the prior art described above, and to overcome other limitations that will become apparent upon reading and understanding the present specification, the present invention provides a method and apparatus for dynamically addressing a plurality of function modules communicating with a controller over a data bus. In one embodiment, to initiate the addressing function, the controller will transmit on a control line an enabling signal to the first programmable function module connected to the control line. This enabling signal will inform the module the addressing function is about to begin. The programmable controller will then transmit predetermined address identification information on the bus.

The programmable function module will then access the bus to receive the address identification information. It will then assign itself a unique address as determined by the address identification information. The programmable function module will modify the address identification information in a predetermined manner. The addressed programmable function module will then transmit the enabling signal on the control line to the adjacent programmable function module informing the adjacent module that it may retrieve the modified address identification information off the serial bus. The programmable function module will then place the modified address identification information on the bus.

This sequence of events will be repeated for each programmable function module present in the system. When the last function module attempts to send the enabling signal to an adjacent function module, the absence of an adjacent function module will cause the last function module to send the enabling signal to the programmable controller. The programmable controller will receive the modified address identification information from the final function module and will then establish the number of function modules connected to the bus, and inherently, the address of each function module.

In one preferred embodiment, after enabling the first programmable function module, the programmable controller will transmit a predetermined number of clock pulses as the address identification information. The first programmable function module will receive the string of clock pulses and assign itself a unique address as determined by the number of clock pulses received. On possibility is assigning itself an address equal to the number of clock pulses received. The programmable function module will then enable the next function module, modify the number of clock pulses received in predetermined manner such as incrementing the number of clock pulses and transmit the modified string of clock pulses to the next programmable function module.

In another preferred embodiment two signals are added to a conventional serial bus cable. The signals originate from a bus interface board (BIF) and connect through the serial bus connector to each function module or secondary station on the bus. The signals, referred to as address enable (AEN) are used to inform the receiving module that an address cycle is about to begin. On detecting the AEN signal go active, the receiving function module will begin counting clock pulses generated on the serial bus data line by the BIF board. When the AEN signal goes inactive, the receiving module will assign the number of received clock signals as its module address. The module will then increment the received clock count by one, and activate the AEN signal to the next adjacent module on the bus. The next function module will then receive the number of clock pulses as modified and assign this modified number of clock pulses as its address. The cycle will continue until the final function module on the bus receives its station address. The final module will automatically terminate the bus by the absence of a cable in that module's output (COM OUT) connector. The bus termination will automatically cause the final module station address incremented by one to be returned to the BIF board utilizing the second AEN signal on the serial bus cable. On detection of its AEN signal going active, the BIF board will count the number of clock signals received on the data bus. The number of clock signals received when the AEN signal goes active will represent the total number of function modules plus one since the final function module incremented it station address prior to forwarding it back to the BIF board.

The present invention will ensure that each function module is assigned a unique address, as well as automatically determine the connection sequence of the function modules. This will eliminate the potential for error present in a static module address environment. The present invention provides a method of addressing which is transparent to the operator and requires no operator intervention or special installation procedures. As modules are added to, or taken away from the system, the present invention will enable the system to automatically adjust to the change in the modular configuration of the system.

The present invention provides a dynamic addressing method eliminating the need for physical switches or predetermined address settings in memory, such as the burning of an address into an EPROM. Furthermore, the present invention provides for limitless connections and provides for automatic line termination. The present invention overcomes configuration problems associated with the use of multiple similar modules in one system. Moreover, rearrangement of modules does not effect system operation since the system can dynamically adjust the addressing of the modules. The number of modules present in the system is automatically determined by the method of the present invention.

Another significant advantage of the present invention is that all the modules have the same electrical and physical configuration. No unique configuration lines or connectors are required with the use of modules having different functions.

These and various other advantages and features of novelty which characterize the present invention are pointed out with particularity in the claims annexed hereto and forming a part hereof. However, for a better understanding of the invention, its advantages and objects attained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration of a specific embodiment of which the invention may be practiced It is to be understood that other embodiments may be utilized and structural changes may be made without departing from the scope of the present invention.

Described is a method and apparatus for dynamically addressing a plurality of programmable function modules communicating with a programmable controller over a serial data bus. When a plurality of peripherals or programmable function modules are communicating with a programmable controller, assigning addresses to each function module facilitates the transfer of information from controller to function modules or function modules to function modules. While it is possible to establish static addresses in each function module, the methods for establishing the static addresses are either cumbersome or prone to error. Further, with a modular concept, there could be any number of modules connected in any order. Therefore, a dynamic addressing system which is transparent to the operator and requires no intervention or special installation procedures will provide reliable address assignments and no possibility for error.

Figure 1:
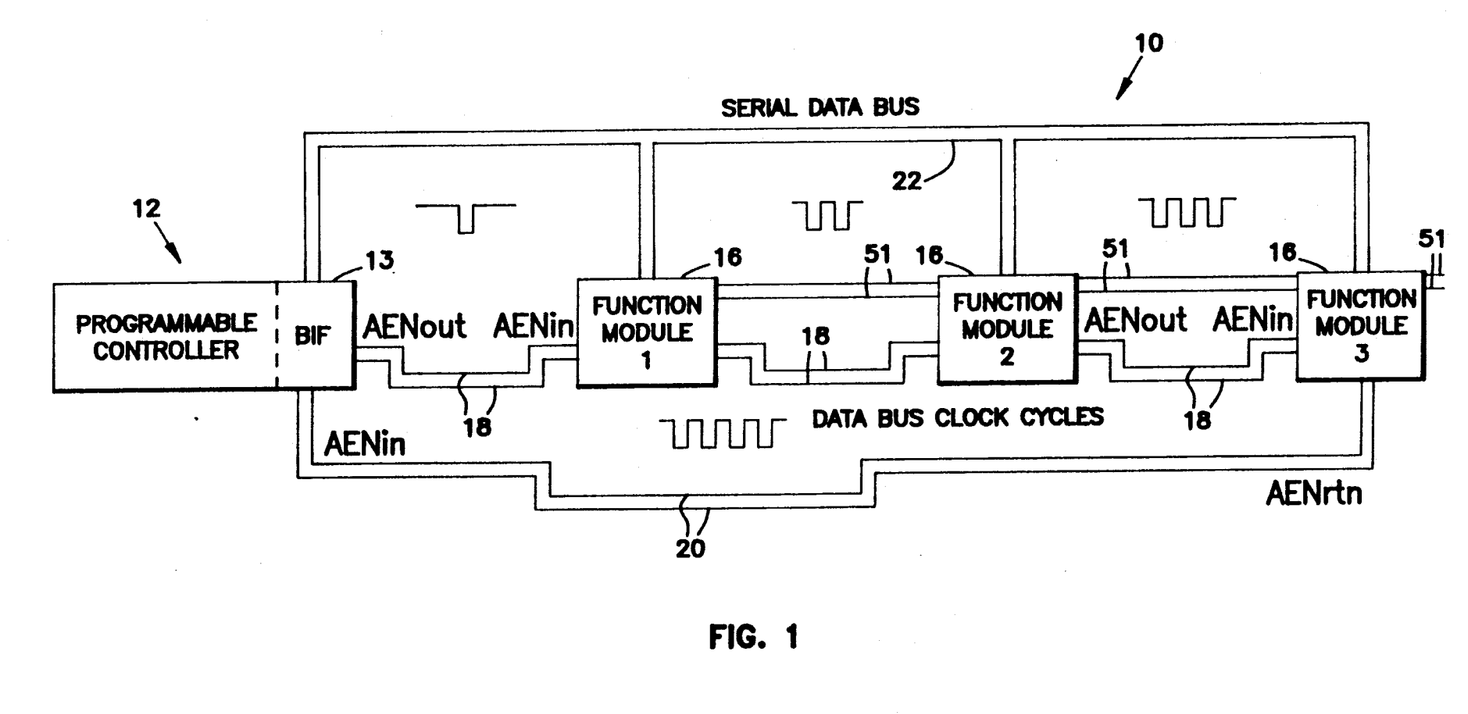
FIG. 1 shows a schematic diagram of an embodiment of an automatic station identification system in accordance with the principles of the present invention and depicts an example of a possible addressing scheme.

FIG. 1 shows a schematic diagram of a possible automatic station identification system 10. A programmable controller 12 initiates and controls the addressing procedure. A plurality of programmable function modules 16 are electrically interconnected to the programmable controller 12. In the embodiment shown, the controller includes a bus interface board (BIF board) 13 which provides interfacing between the controller 12 and the function modules 16. In the embodiment shown, the controller 12 is an IBM PC/AT compatible computer, the BIF board 13 being mounted in one of the expansion slots of the computer.

Each programmable function module 16 is electrically interconnected to the BIF board of the programmable controller 12 by at least two control lines 18 and 20. A serial data bus 22 is interconnected to the BIF board 13 of the programmable controller 12 and to each programmable function module 16 thereafter and is used for the transfer of data between the controller 12 and the function modules 16. In the embodiment shown, a serial bus cable has had the two control lines 18 and 20 added to it. Thus, the control lines 18 and 20 and the serial bus 22 are interconnected between modules by connecting serial-bus cables between the BIF board and the adjacent module and between subsequent adjacent modules in a daisy chain fashion. This first control line 18 is electrically interconnected between the programmable controller 12 to the programmable function module 16. Each function module 16 thereafter is daisy-chained to the preceding programmable function module 16 with the first control line 18.

Figure 2:
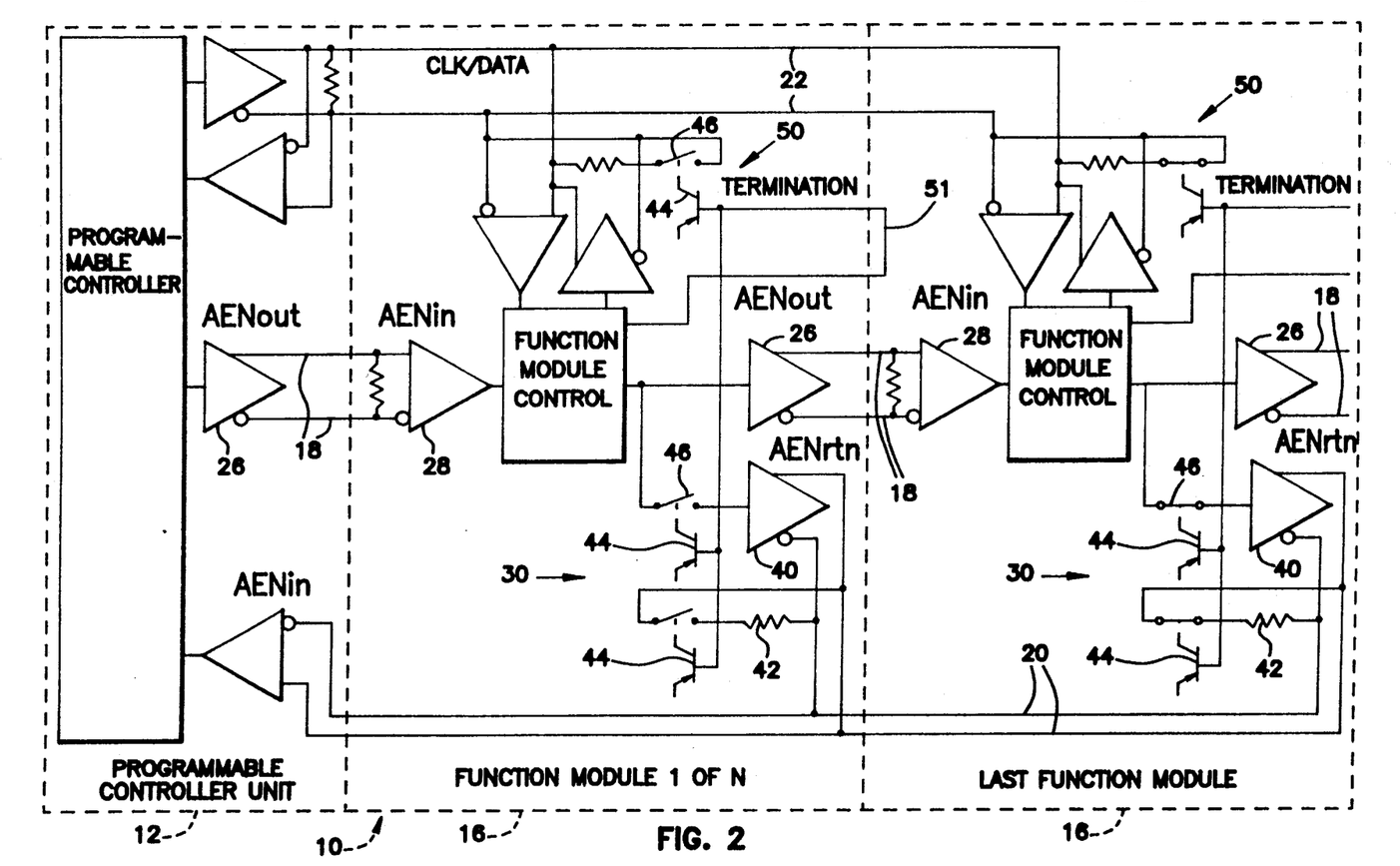
FIG. 2 shows block diagram if the embodiment shown in FIG. 1 including a programmable controller and a plurality of function modules.

In the embodiment shown, there are three function modules present. However, it will be appreciated that there may be any number of function modules present in the system. The last programmable function module 16 is not connected to an adjacent function module. As illustrated in FIG. 2, each of the programmable function modules 16 will include enabling return circuitry 30, which will check to see if the function module 16 is electrically cabled to an adjacent function module 16. If the function module 16 is not electrically connected to an adjacent function module; i.e., the last function module in this sequence, then the enabling return circuitry 30 of the function module will interconnect the function module 16 to the programmable controller 12 by the control line 20. To ensure maximum modularity, each programmable function module 16 will ideally include the enabling return circuitry 30. However, only those function modules 16 which may possible be the last programmable function module 16 in the sequence, need necessarily contain the enabling return circuitry 30.

Referring now to FIGS. 1 and 2, the programmable controller 12 initiates the automatic addressing procedure by sending an Address ENable (AEN) signal out of an enabling output port 26. This control signal is electrically conducted over the first control line 18 and received by the first function module 16 through its enabling input circuit 28. Upon receiving the AEN signal the first function module 16 will begin counting the one (1) MS clock pulses being transmitted on the serial data bus by the controller 12 so as to receive addressing information. The programmable controller 12 generates a predetermined number of clock pulses as the addressing information. In the preferred embodiment, the programmable controller 12 generates a single clock pulse. While in this example the addressing information comprises a string of clock pulses, it will be readily apparent to anyone skilled in the art that information packets or an incremented counter could be used as the addressing information.

During the time each function module 16 is enabled, it will count the number of the clock pulses being transmitted on the serial data bus 22. In this specific case the first function module 16 will count the single clock pulse generated by the programmable controller 12. When the AEN signal goes inactive, the receiving station, function module one, will assign itself a unique address as determined by the number of received clock pulses. This predetermined manner of assigning itself an address will be consistent with all of the programmable function modules 16 and will be known by the programmable controller 12. One possibility would have the function module 16 receiving one clock pulse assigning itself station address 1000 and the function module 16 receiving two clock pulses assigning itself station address 2000. In this example, function module 16 will assign itself a unique address equal to the number of clock pulses it receives. Therefore, function module one, which received one clock pulse, will assign itself station address one.

After assigning itself an address, the function module 16 will then change the received addressing information in a predetermined manner. In this example, the function module 16 will increment the number of received clock pulses by a predetermined amount, specifically by one clock pulse. The function module 16 will then activate an Address ENable (AEN) signal and output it out of its enabling output circuit 26 on the first control line 18 where the second function module 16 will receive the AEN signal through its enabling input circuit 28.

The second function module 16 will then access the serial bus 22 and receive the two clock pulses which the first function module 16 transmits over the serial data bus 22. Here, the second function module 16 will perform the same operations as the first function module 16 did. Specifically, it will assign itself an address of 2, increment the number of clock pulses to 3, transmit an AEN signal to the next function module which is daisy-chained to it on the first control line 18, transmit three clock pulses onto the serial data bus 22 and cancel or cause the AEN signal to go inactive after the three clock pulses have been sent.

The third function module 16 is also programmed to perform the same operations as the first 16 and second 16 function modules. After assigning itself its unique address, the third function module 16 will increment the number of received clock pulses by one, and attempt to activate the AEN signal out of its enabling output circuit 26. As the third function module 16 is not connected to an adjacent module, the third function module 16 will automatically terminate the bus 22 and cause the third function module 16 to send an AEN signal out its enabling return circuit 30 and over the second control line 20 back to the programmable controller 12. Upon receiving the AEN signal, the programmable controller 12 accesses the serial data bus 22 to count the clock pulses transmitted by the third function module 16. The programmable controller 12 will receive a string of clock pulses equal to the number of clock pulses the final function module 16 received incremented by the predetermined amount. When the AEN signal goes inactive, the controller 12 will store the number of clock pulses as the number of modules plus one. In this example, the programmable controller 12 will receive four clock pulses on the serial data bus 22. Therefore, the programmable controller now knows the number of function modules connected to the serial data bus 22, the address of each function module 16, and the sequence in which the function modules 16 are connected.

FIG. 2 shows a block diagram of the automatic station identification system 10. The programmable controller 12 is the central processor in the system. Its function in the automatic station identification sequence is to identify how many programmable function modules 16 are connected to the serial bus 22, identify the addresses of the function modules 16, identify the configuration of each function module 16 and identify where each function module 16 is physically located thereby identifying the connection sequence of the function modules 16. The programmable controller 12 is adapted with circuitry to access the serial bus 22 for electrically transmitting clock pulses, data, and other information. The first control line 18 is a point-to-point connection between one function module 16 and another. The point-to-point connection also occurs between the programmable controller 12 and the first function module 16. The first control line 18 is differentially driven to overcome ground differences. The driving source is always the module closest to the programmable controller 12.

The serial bus 22 is used for carrying the clock pulses which are transmitted by the programmable controller 12 and function modules 16 during the addressing sequence, and after initialization, is used for system communication. The serial bus 22 is also a differentially driven connection. One main difference between this electrical conductor and other function module connections is that the signal on the serial bus 22 can be driven by all modules 16 as well as the programmable controller 12. The system protocol will not permit more than one function module 16 on this circuit for accessing the bus 22 at a time.

An automatic line termination circuitry 50 resides in all function modules 16 that could potentially be the last function module 16. The automatic line termination circuit 50 has two functions. First, since the serial bus 22 is bussed throughout the system and since it is differentially driven, it must be terminated. This termination circuit 50 applies to the line termination at the last function module 16. While the first control line 18 and the second control line 20 are also differentially driven and need line termination, since they are point-to-point connections, their termination is always applied at the end of their connection at the input port of the adjacent function module 16. Secondly, the enabling return circuit 30 is enabled to be driven by a signal generated by the enabling output circuit 26 of the function module 16. Termination is done by a loopback signal circuit 51 connecting two adjacent modules 16 together. When an adjacent module 16 is present, the loopback signal circuitry 51 disables the bus termination circuit 50 and the enabling return circuitry 30. Conversely, a missing adjacent module 16 breaks the loopback connection 51, whereby the bus 22 is terminated and the enabling return circuit 30 is completed.

The enabling return circuitry 30, when completed, possibly comprising drivers 40, resistors 42, transistors 44, and switches 46, produces a differentially driven signal (AENrtn) transmitted on the second control line 2 which is received by the programmable controller 12 as a completion response to the automatic addressing sequence. The last function module 16 will not know that it is the last function module 16, but rather it is programmed to respond to the AEN signal received from its adjacent function module, receive and transmit the clock pulses as the earlier function modules 16 did. Therefore, the enabling return circuit 30 and the automatic line termination circuit 50 are responsible for automatically routing the final enabling signal from the final function module 16 to the programmable controller 12. This will allow greater flexibility in the modularity of the system as any function module 16 may be the last function module 16 without any special programming required as long as the automatic line termination circuit 50 and the enabling return circuit 30 are included.

FIG. 3-10 show structure and logic flow of a possible configuration for an automatic station identification system 10. These diagrams are for an embodiment of the invention which includes a programmable controller 12 comprising a controller such as a host computer which includes a bus interface board for interfacing with the serial data bus 22, control lines 16, 18, and programmable function modules 16. It will be readily apparent to those skilled in the art that there may be many different embodiments for the programmable controller such as a programmable board in a computer or a function module dedicated to the task of managing the automatic station identification sequence. Further, the invention could comprise a computer and its peripherals or a personal computer and its add-in cards. The automatic station identification requires a two-phase operation; a dynamic addressing sequence followed by a configuration sequence.

Figure 3:
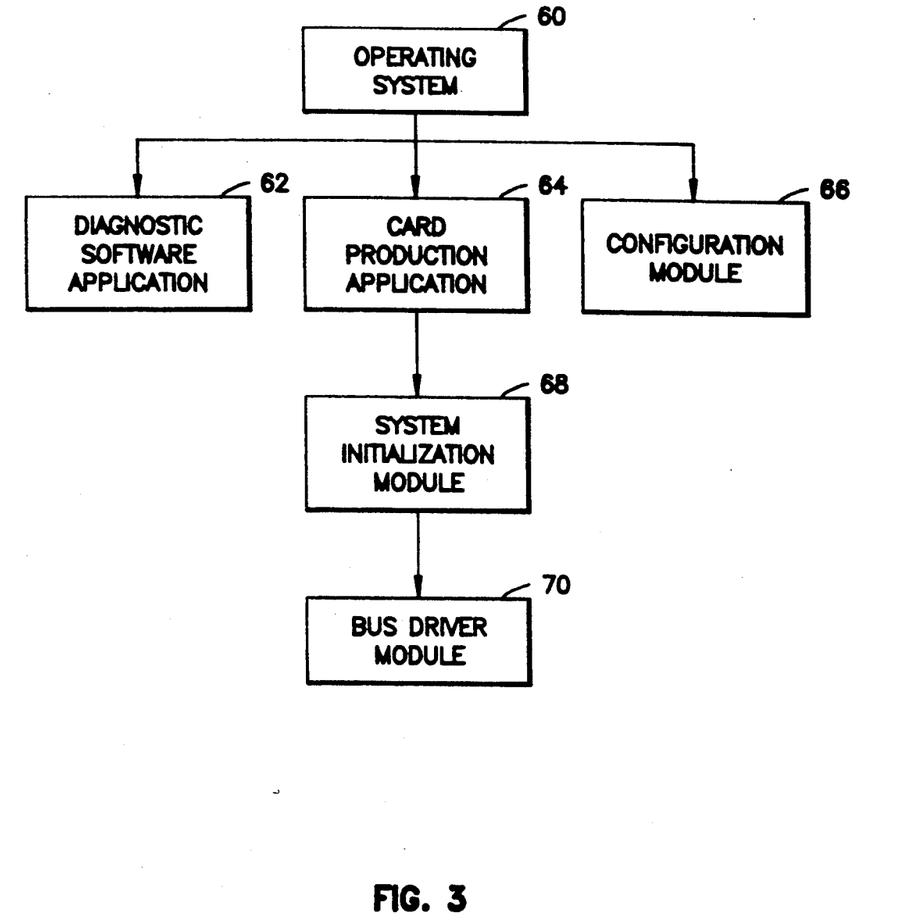
FIG. 3 shows a block diagram of an embodiment of controller software.
Figure 4:
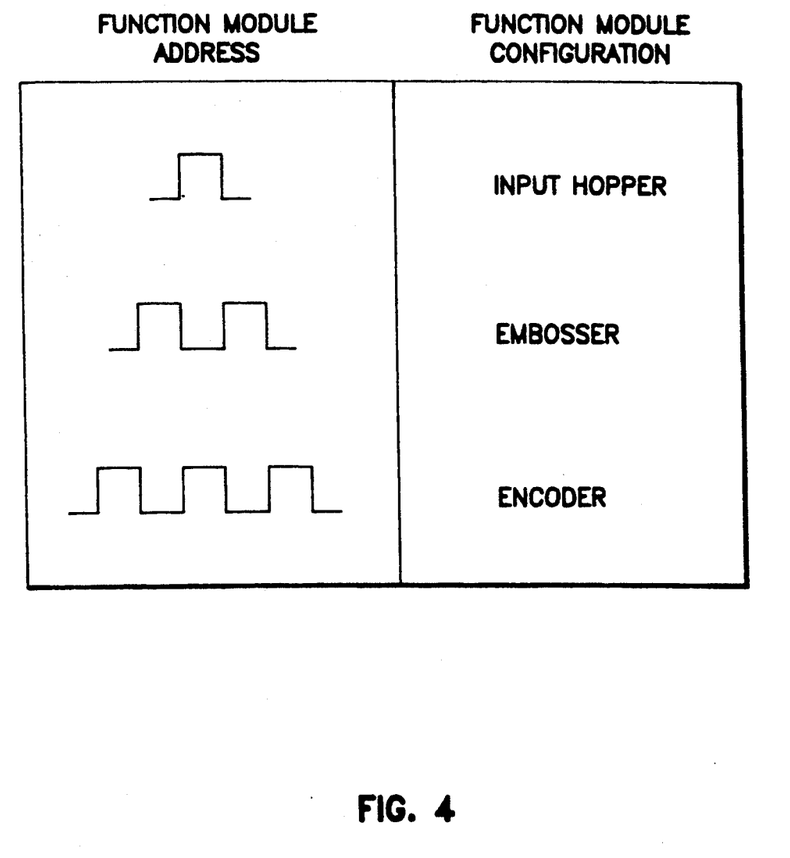
FIG. 4 shows a representative diagram of a configuration table residing in the programmable controller's configuration file.

FIG. 3 shows a block diagram depicting the functional modules required by the programmable controller 12 to perform its intended application as well as managing the system. At 60, an operating system is shown such as DOS or OS/2 which manages the basic interactions between software used by the programmable controller 12 which might be an IBM PC/AT compatible computer or other suitable computer. At 62, diagnostic software might typically be present for checking system components such as memory or for querying a series of parts to ensure that they are connected properly. At 64, card production application software is software that will reside in the programmable controller 12 for managing the application of the system, in this case, card production. In the case of a card production application, the controller would need software for the management of the function modules 16 such as embossers, input hoppers, printers and magnetic stripe encoders, etc., necessary for manufacturing data cards as well as managing the data necessary for production of the cards. At 66, configuration software for initiating the configuration sequence resides in the configuration files. The configuration file further stores a table with the address of each function module and its configuration such as its function as shown in FIG. 4. Other modules pertinent to the automatic system configuration include the system initialization module 68 and the bus interface driver 70. The bus interface board 13 interfaces the programmable controller 12 with the serial bus 22.

Figure 5:
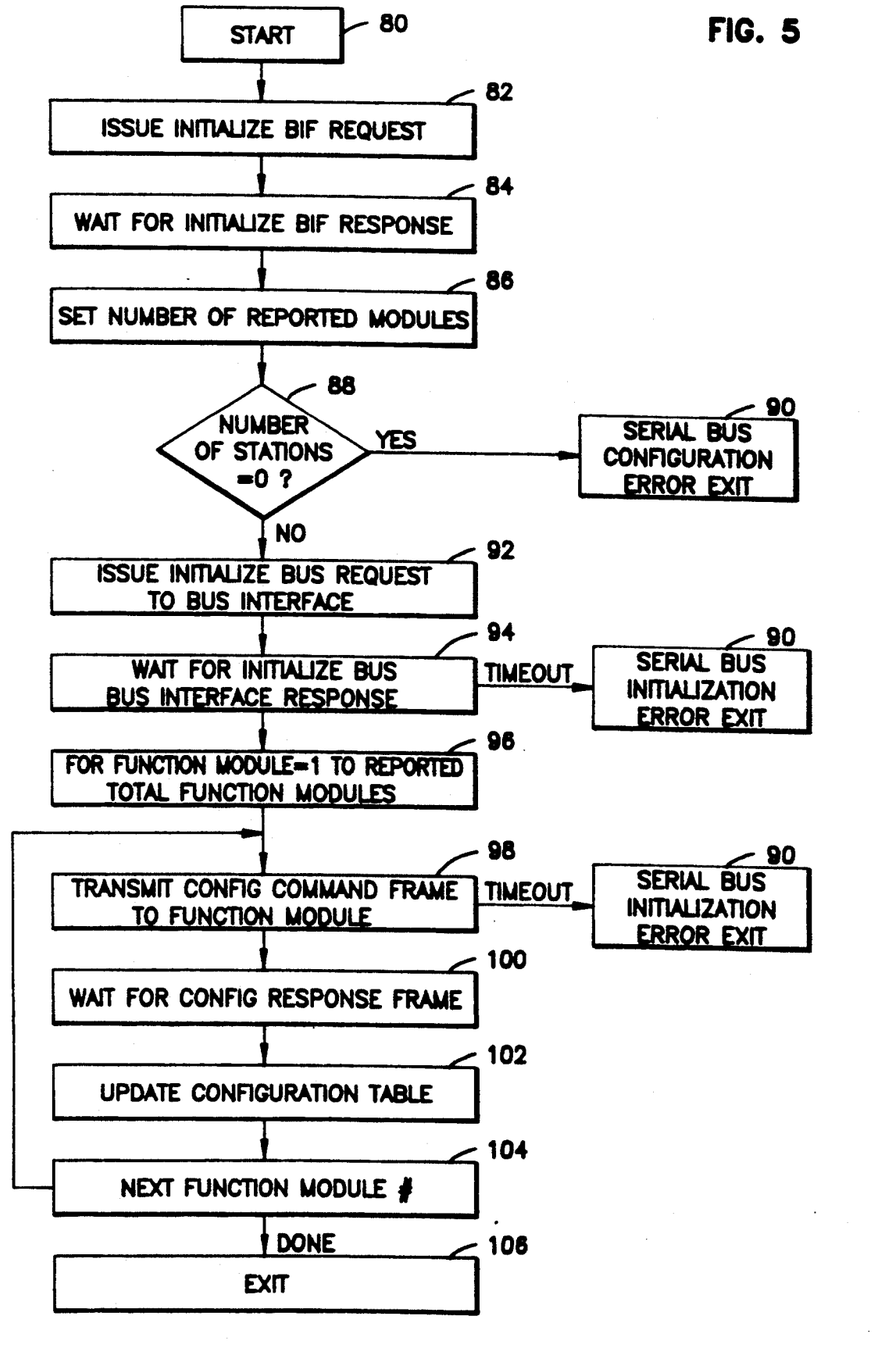
FIG. 5 shows a logic flow diagram of the steps performed by the controller software to initiate the addressing sequence.

FIG. 5 represents an embodiment of a high-level control flow performed by the controller configuration sequence. At 80, the programmable controller's software will initiate the automatic station identification sequence through an INITIALIZE BIF request at 82 sent from the controller 12 to the bus interface board (BIF) 13. The controller 12 will then wait for a response from the bus interface board 13 or the INITIALIZE BIF request at 84. Included in the INITIALIZE BIF request is a request from the controller for the bus interface board 13 to either perform or skip the automatic station identification sequence. The INITIALIZE BIF request contains a parameter defining the number of function modules configured in the system. If this parameter is set to zero, the bus interface board 13 will initiate the automatic station identification sequence as previously discussed to determine the number of modules 16, assign them addresses, and determine their connection sequence. If a non-zero parameter is passed, the bus interface board 13 will assume this to be a predetermined number of function modules and will forego the automatic station identification sequence.

The bus interface board 13 will then issue an INITIALIZE BIF response to the controller 16 which will include the number of detected function modules 16 as a response parameter. At 86 the programmable controller 12 will then store the number of reported function modules by the BIF board 13 in its memory. At 88 the programmable controller will check the number of reported function modules 16 and if the number of reported stations is zero, the controller 12 will assume the automatic station identification sequence has failed, possibly due to a serial bus 22 connection failure or that no function modules 16 are connected to the serial bus 22 and at 90 will exit the automatic station identification sequence.

If, on the other hand, the number of function modules reported is not zero, at 92 the programmable controller will issue an INITIALIZE BUS request to the bus interface board 13. On receipt of the INITIALIZE BUS request, the bus interface board 13 will issue a series of commands to each of the detected function modules 16. These commands may include commands setting the function modules, status as operational, commands asking for the maximum size data packet that may be received by a function module 16, or other types of data deemed relevant for controlling this serial bus 22. For example, if a command is sent to a function module 16 asking for the maximum size data packet that can be received by the function module 16, the response will allow the bus interface board to control the transmit/receive buffer allocation, as well as to prohibit the controller from attempting to transmit an oversized data packet to a function module 16. The response from the function modules 16 will give a value representing the largest frame that can be accepted by the responding function module 16. At 94 the programmable controller 12 will set a gross time out and wait for the INITIALIZE BUS response from the bus interface board 13. If this gross time out expires before the response, the controller will exit the serial bus initialization sequence at 90.

The bus interface board 13 will respond to the INITIALIZE BUS response containing a bit mask of defined function modules 16 as determined by the addressing sequence. The response to the INITIALIZE BUS command will be returned prior to the bus interface board 13 performing the actual bus initialization sequence due to the potential time required to perform the bus initialization period. Instead of waiting for the entire serial bus 22 to become initialized before responding, the bus interface board 13 will respond immediately to the INITIALIZE BUS command and generate a signal sent to the controller 12 as each function module 16 successfully completes the bus initialization sequence. Any function module 16 failing to complete the initialization sequence will be reported to the controller 12.

Then, for each function module 16 reported to the controller 12, the controller 12 will be responsible for requesting/verifying the configuration of each function module 16 in the system. At 96, for each reported function module 16, the programmable controller 12 will transmit a CONFIG command frame requesting that module's configuration at 98. Again, the programmable controller 12 will then set a gross time out and wait for the CONFIG response frame at 100. If the function module 16 does not respond to the CONFIG command, the programmable controller 12 will exit the configuration sequence at 90 due to serial bus initialization error.

The controller 12 will have the option of maintaining a static configuration file, such as a table, describing the configured number of function modules 16, as well as the characteristics of each module 16. The controller 12 may choose to maintain a static count of the total number of function modules 16, and verify the count returned by INITIALIZE BIF response from the bus interface board 13 and maintaining a dynamic configuration table by requesting the characteristics of each module 16 on receipt of the INITIALIZE BUS response from the bus interface board 13. Or the controller 12 may also choose to maintain a totally dynamic configuration utilizing the number of function modules 16 returned by the INITIALIZE BIF response and requesting the function module 16 characteristics from each function module 16 on receipt of an INITIALIZE BUS response from the bus interface board 13. Either way, the programmable controller 12 will receive the response from the bus interface board 13 to the CONFIG command frame and will then update its configuration table at 102. At 104 the programmable controller 12 will repeat this for each module 16 thereby completing the automatic station identification sequence at 106.

Figure 6:
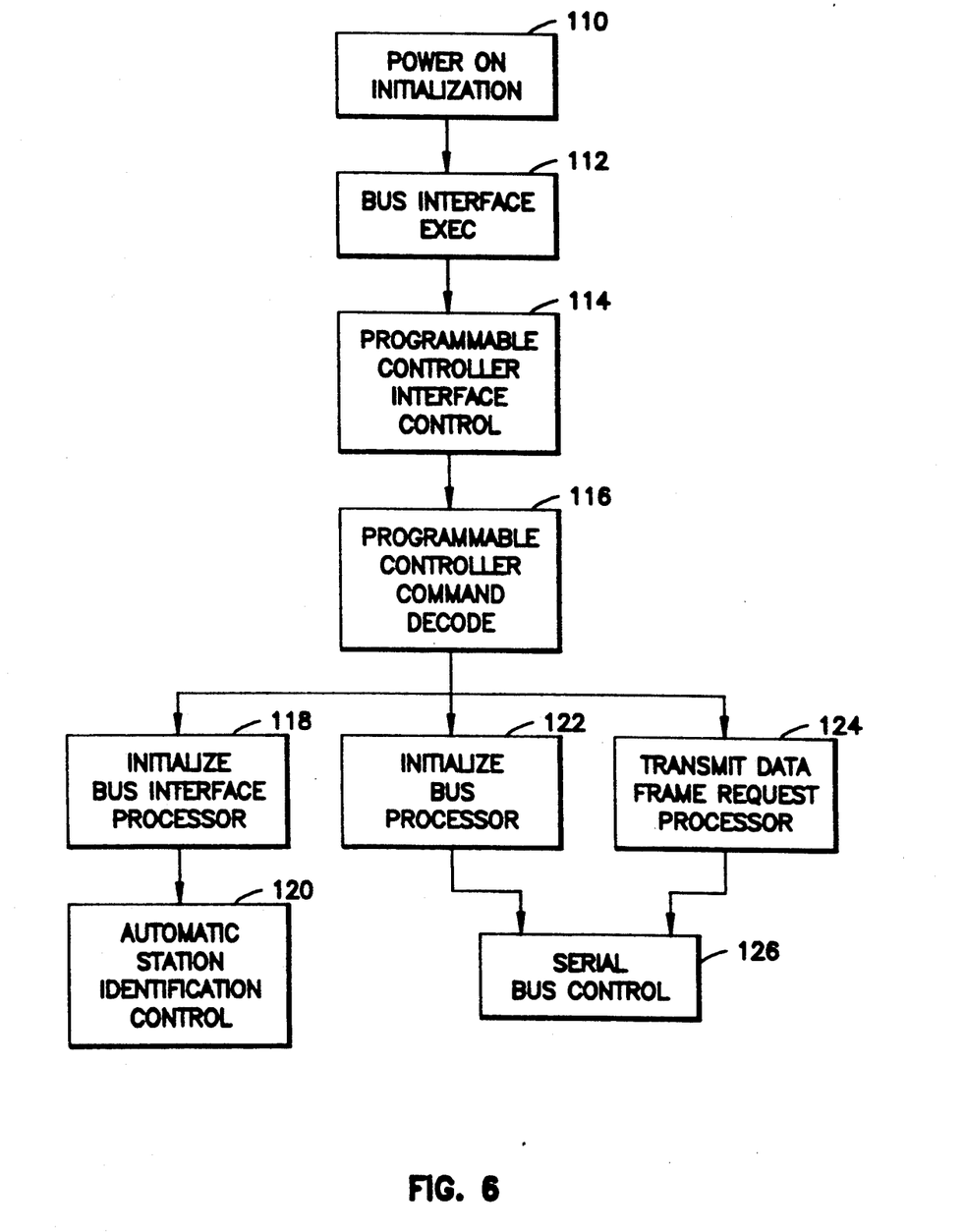
FIG. 6 shows a block diagram of an embodiment of a bus interface board's firmware.

FIG. 6 shows the firmware structure of the bus interface board 13 installed in the host computer. When the power is turned on, the bus interface board 13 will go through an initialization sequence at 110 as well as run its executive file at 112. The bus interface board 13 further needs means for controlling the interfacing with the programmable controller 12 at 114 and a module for decoding the programmable controller's commands at 116. Also included in the bus interface board's firmware structure are responsibilities such as initializing the bus interface processor at 118, initializing the serial bus processor at 122, and transmitting the data frame request processor at 124. Further the bus interface board 13 is shown having an automatic station identification control at 120, and a serial bus control at 126.

Figure 7:
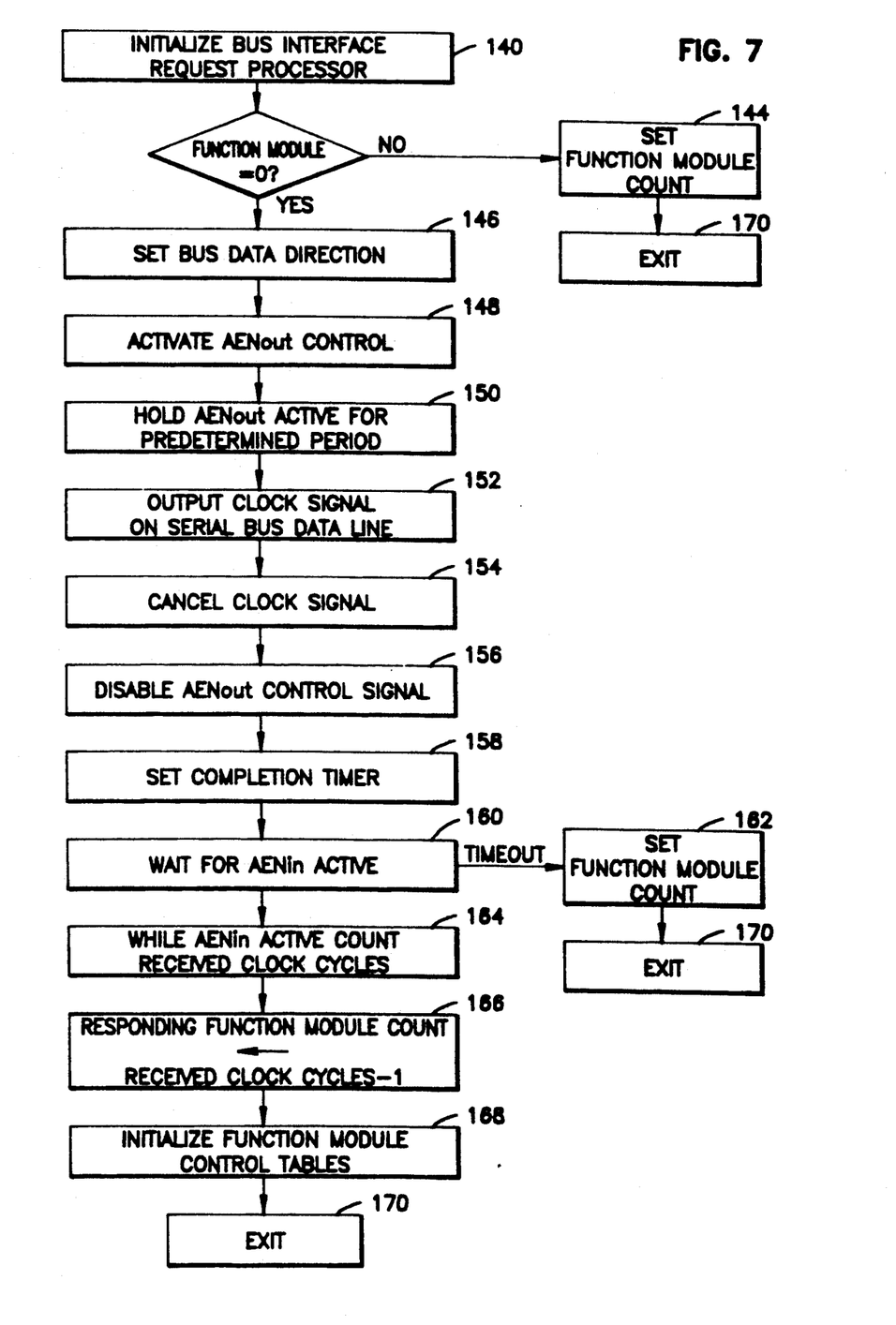
FIG. 7 shows a logic flow diagram of the steps performed by the bus interface board during the station addressing sequence.

FIG. 7 represents the high-level control flow performed by the bus interface board 13 during the automatic addressing sequence. At 140 the bus interface board 13 first initialize its request processor. At 142 when it receives its INITIALIZE BIF request containing the parameter defining the number of function modules 16 configured in the system it will check if number is set to zero. If it is not set to zero, the bus interface board 13 will set this number of function modules as its function module count at 144 and exit the dynamic addressing sequence at 170. If this parameter is set to zero, the bus interface board 13 will proceed with the dynamic addressing sequence. The bus interface board 13 will set the serial bus direction at 146 and activate an address enabling control signal AENout at 148 on the first control line 18. AENout will be received by the first function module 16. At 150 the bus interface board 13 will hold the AENout enabling signal active for a predetermined period of time. Immediately after enabling the first function module 16, the bus interface board 13 will output a clock pulse on the serial bus data line 22 at 152. At 154 the bus interface board 13 will then cancel the clock signal and disable the AENout control signal at 156. Then it will set a completion timer for a predetermined period at 158 and wait for an AENin enabling control signal on the second control line 20 at 160. If the gross timer expires prior to the bus interface board 13 detecting the AENin control signal going active, the bus interface board 13 will assume that the addressing sequence failed possibly due to a serial bus connection failure, will issue an INITIALIZE BIF response to the controller with a detected function module count set to zero at 162 and will exit the addressing sequence at 170.

On detecting the activation of the AENin control signal on the second control line 20, the bus interface board 13 will begin counting the number of clock pulses received on this serial bus 22 until the AENin control signal is deactivated by the transmitting station at 164. After the AENin control signal is deactivated, the bus interface board 13 will know the number of function modules connected to the serial bus 22 is equal to the number clock pulses received minus one due at 166 to the fact that the fact that the last function module 16 incremented the number clock pulses it transmitted to the serial bus 22 by one. On successful completion of the addressing sequence, the bus interface board 13 will initialize its internal serial bus control tables, building a function module control table for each detected function module 16 at 168 and then exit the addressing sequence at 170.

Figure 8:
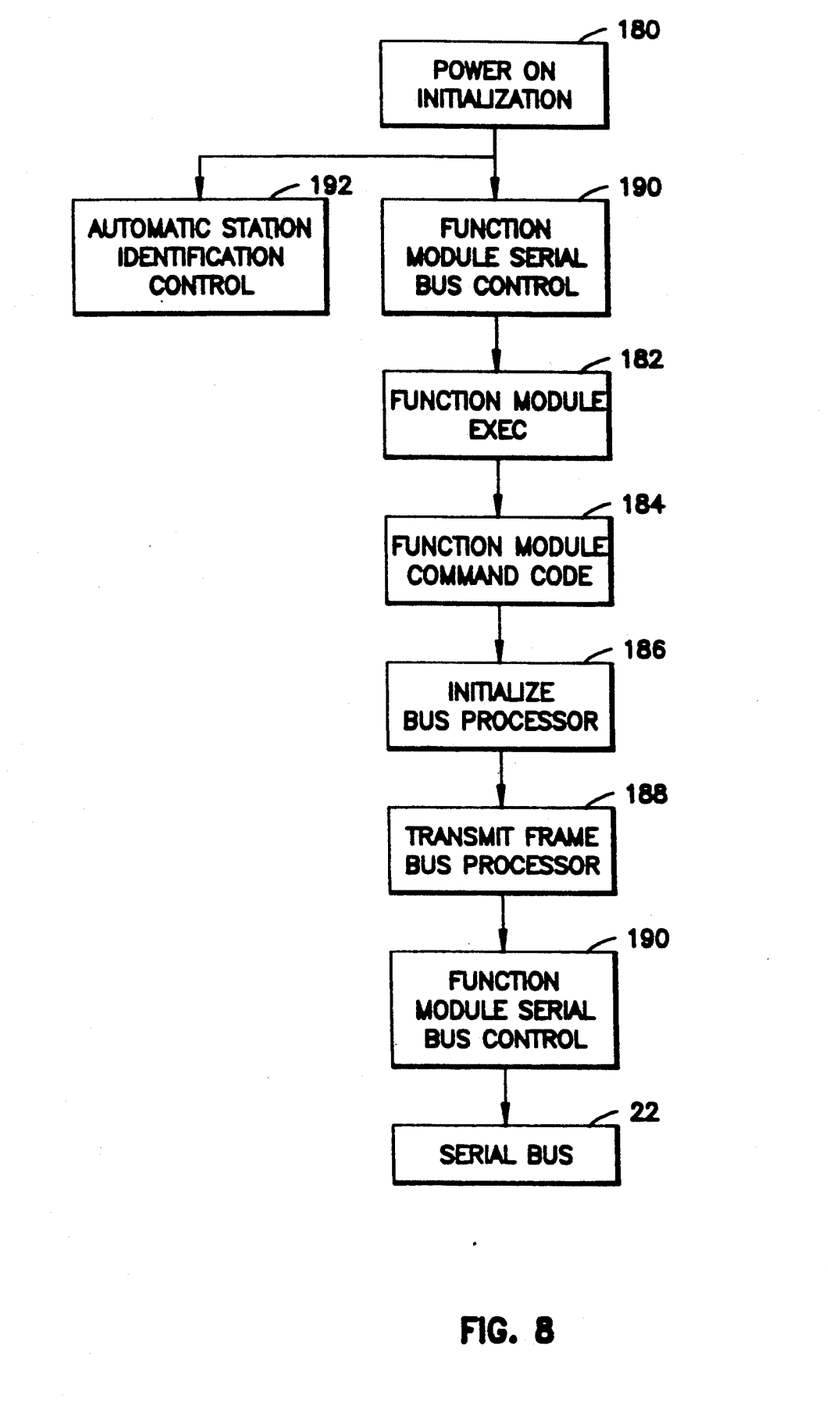
FIG. 8 shows a block diagram of a programmable function module's firmware.

FIG. 8 shows a structure of the firmware of a function module 16 connected to the serial bus 22. When the power is turned on, the function module 16 will go through an initialization sequence at 180 as well as run its executive file at 182. The function module 16 must also have means for decoding the commands it receives at 184, and initializing its bus processor at 186. When the function module 16 receives the INITIALIZE BUS request from the bus interface board 13, the function module 16 must build a response to transmit to the bus interface board at 188. The function module 16 also needs a serial bus control module at 190 for controlling the serial bus 22, and an automatic station identification control module at 192 for controlling the dynamic addressing and configuration sequence.

Figure 9:
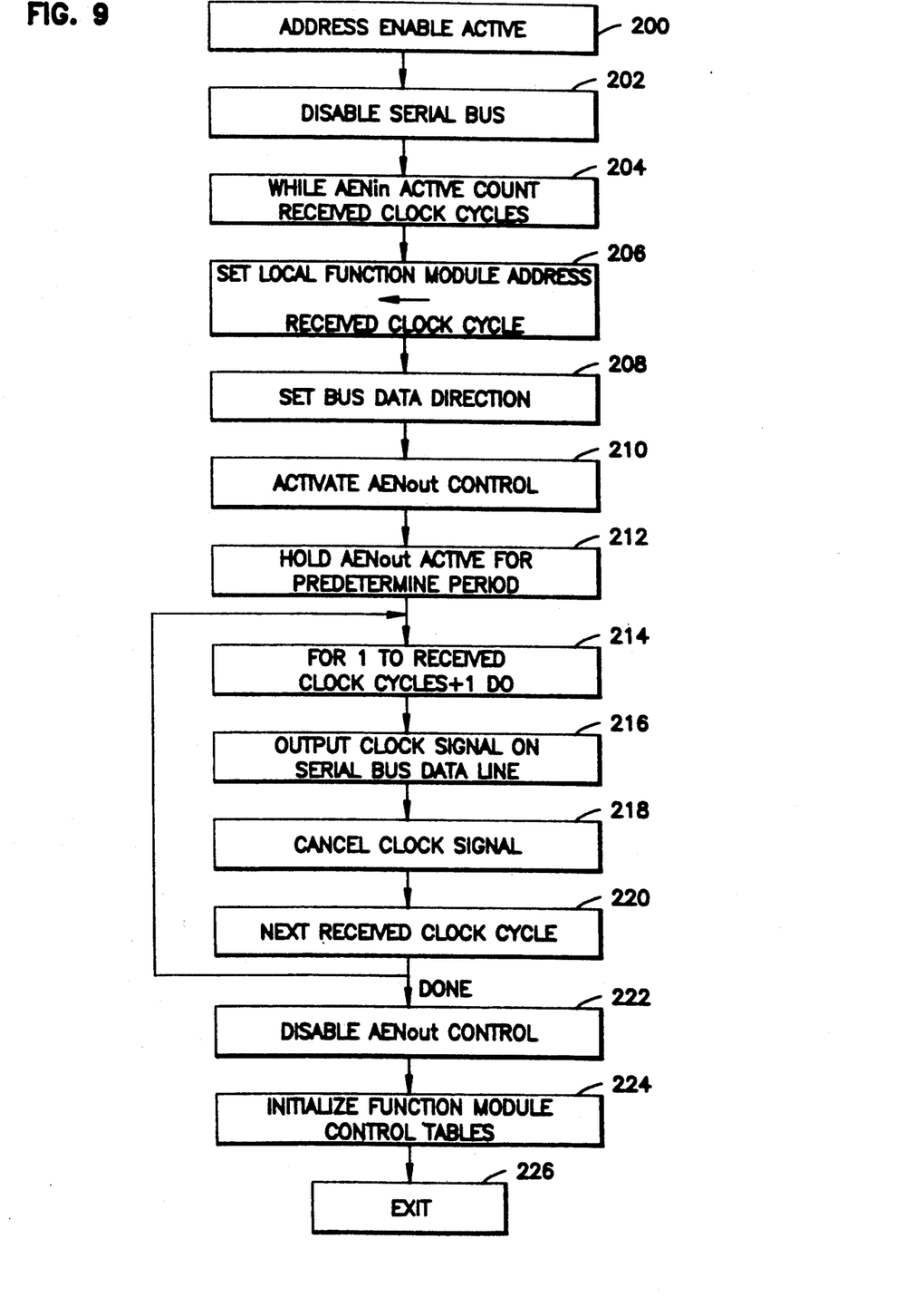
FIG. 9 shows a logic flow diagram of the steps performed by the programmable function modules during the automatic station identification sequence.

FIG. 9 represents a high-level control flow performed by each function module 16 during the automatic module addressing sequence. When the function module 16 receives an enabling signal from the first control line 18 at 200 the function module will disable the serial bus 22 at 202 and monitor the serial bus 22 for receiving clock pulses. The function module 16 will count the number of clock pulses until the enabling signal AENin becomes inactive at 204. Once the AENin control signal becomes inactive the function module 16 will assign itself a unique address in a predetermined manner. At 206, one possibility is shown of setting its local station address equal to the number of clock pulses it received. The function module 16 will then set the data bus direction at 208 and activate an enabling signal on the first control line 18 at 210. The function module 16 will hold the AENout control signal active for a predetermined period of time at 212, the predetermined period of time long enough to allow the function module 16 to output a string of clock pulses to the next function module 16.

The function module 16 will enter a loop comprising the steps of outputting a single clock pulse on the serial bus line at 216, cancelling the clock signal at 218, and preparing the next received clock pulse at 220. The function module 16 will perform the steps in the loop a number of times equal to number of clock pulses the function module 16 received, changed by a predetermined number of clockpulses, in this case, incremented by one at 214. After transmitting a string of clock pulses to the adjacent function module 16, the function module 16 will disable the AENout enabling signal on the first control line at 222.

Figure 10:
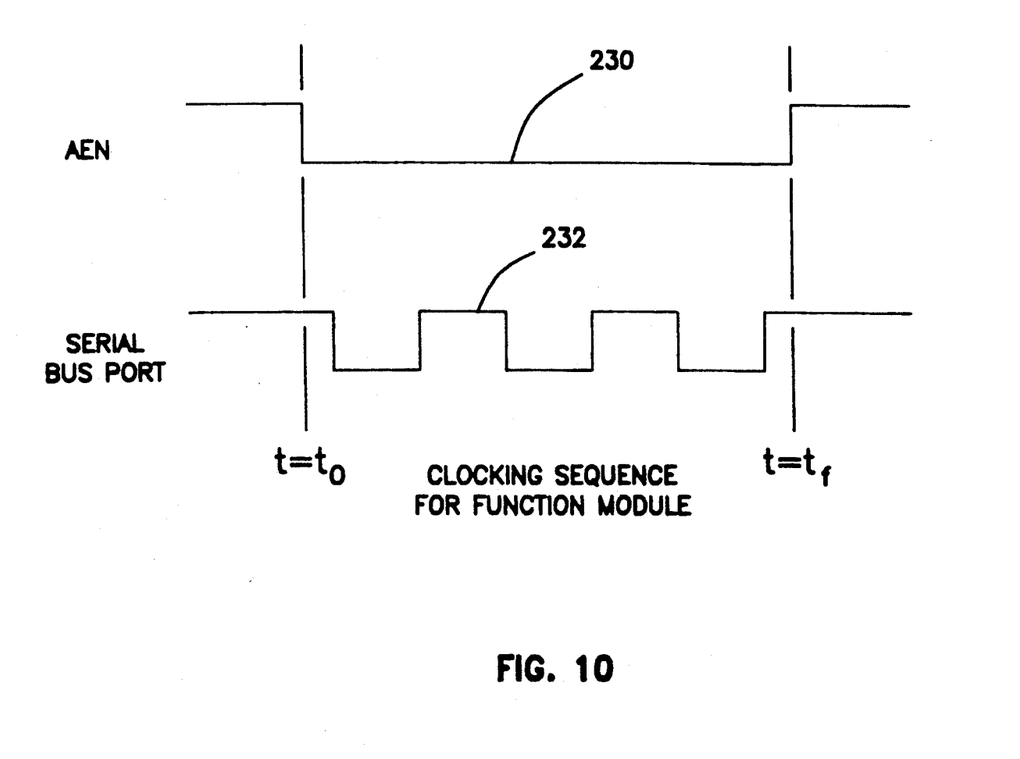
FIG. 10 shoes an example clocking sequence including an address enable signal and the clock pulses on the serial bus during the automatic station identification sequence.

An example of the clocking sequence is depicted in FIG. 10. When the address enabling (AEN) control signal goes active at time $t=t_o$ the function module 16 will begin to count the number of clock pulses transmitted on the serial bus 22 by the preceding adjacent function module 16. In this specific example, the function module 16 will count three clock pulses 232 on the serial bus 22 before the enabling signal AEN goes inactive at time $t=t_f$. Therefore, in this example, the function module will have received three clock pulses, assigned itself an address which corresponds in some predetermined manner to three clock pulses, and will transmit four clock pulses onto the serial bus 22 to the next function module 16. The function module 16 will then initialize its control table at 224 thereby completing the automatic station identification sequence at 226.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

We claim:

1. A method for automatically assigning an address to an individual function module of a plurality of such function modules which are electrically interconnected to a controller by a common data bus for transmitting data to the function modules and a control line to which the modules are interconnected in point to point fashion, the method comprising the steps of:
   a) beginning with a first function module F[N] where N equals 1, transmitting from the controller an enable control signal by way of the control line to the function module F[N] of the plurality of function modules $F_8$[1]-F[TOTAL] so as to enable the [first] function module F[N] and transmitting along the command data bus a predetermined number of pulses to the [first] function module F[N] of the plurality of function modules F[1]-F-[TOTAL];
   b) the function module F[N] assigning itself a unique address as determined by the predetermined number of pulses received by the function module F[N] from the common data bus;
   c) changing the number of pulses at the function module F[N] by a predetermined amount;
   d) if electrically connected to an adjacent function module F[N+1] by a loopback signal circuit separate and distinct from the common data bus and the control line, transmitting an enable control signal by wall of the control line from the function module F[N] to the adjacent function module F[N+1] of the plurality of function modules by way of the control line so as to enable the adjacent function module F[N+1] and then transmitting from the function module F[N] the changed number of pulses along the common data bus to the adjacent function module F[N+1] connected to the common data bus;
   e) repeating steps b)-d), increasing N by one, until the function modules have been assigned addresses; and
   f) if not electrically connected to an adjacent function module N[N+1] by a loop back signal circuit, transmitting an enable control signal to the controller by a second control line and transmitting along the common data bus the changed number of pulses determinable of the final module's address to the controller.

2. The method of claim 1 wherein step e) further comprises checking whether the adjacent function module F[N+1] is electrically connected to yet another adjacent function module F[N+2] for determining if all the function modules have been addressed.

3. The method according to claim 2 wherein checking whether the adjacent function module F[N+1] is electrically connected to yet another adjacent function module F[N+2] comprises checking for the presence of the electrical conductor connected to a communication output port of the adjacent function module F[N+1].

4. The method according to claim 1 wherein the step of transmitting and receiving pulses by the function modules and the controller comprises transmitting and receiving clock pulses.

5. The method according to claim 1 wherein the step of transmitting a predetermined number of pulses to the function module F[N] comprises transmitting one pulse and the step of changing the number of pulses by a predetermined amount comprises incrementing the number of pulses by one pulse.

6. The method according to claim 1 wherein the step of assigning a unique address to the function module F[N] comprises assigning the number of pulses received by the function module F[N] as its unique address.

7. The method according to claim 1 wherein the step of transmitting the fiber of pulses indicative of the final function module's address comprises transmitting the number of pulses received by the final function module changed by the predetermined amount.

8. The method of claim 1 further comprising the step of polling the function modules for determining the function of each function module;

9. An automatic station identification system comprising:
   a) a common electrical conductor means for electrically conducting address information;
   b) a programmable controller adapted to access the common electrical conductor means for transmitting and receiving address information on the common electrical conductor means;
   c) a plurality of programmable function modules, each function module being electrically connected to the common electrical conductor means for transmitting and receiving address information, the function modules being further electrically interconnected to the programmable controller in point to point fashion by control line means, separate from the common electrical conductor means, for transmitting control signals; each function module programmed to receive address information for the common electrical conductor means upon being enabled by an enable signal transmitted on the control line means, assign itself a unique address as determined by the address information, modify the address information in a predetermined manner, either enable an adjacent function module by transmitting an enable signal on the control line means if electrically connected to an adjacent function module by a loopback signal circuit separate and listing from the common data bus and the control line means or enable the programmable controller by transmitting an enable signal on a second control line means if not electrically connected to an adjacent function module by a loopback signal circuit, and transmit the modified address information on the common electrical conductor means;
   d) programmable controller being programmed to enable a first function module by transmitting an enable signal on the control line means and to transmit predetermined address information on the common electrical conductor means and being further programmed to receive the modified address information as transmitted by a final function module of the plurality of function modules.

10. The system according to claim 9 wherein the predetermined address information comprises a predetermined number of clock pulses and wherein the predetermined manner in which the clock pulses are modified comprises changing the number of clock pulses by a predetermined amount.

11. The system according to claim 10 wherein the predetermined number of pulses sent by the programmable controller is one pulse and the predetermined amount the programmable function modules change the received number of pulses is an increment of one pulse.

12. The system according to claim 9 wherein the electrical conductor means is a serial bus.

13. The system according to claim 12 wherein the serial bus further includes two additional lines for additional control signals wherein a first additional line is electrically interconnected from the programmable controller to the first programmable function module and thereafter in a daisy-chain fashion to and from each programmable function module in the system and wherein a second additional line is electrically interconnected between the last programmable function module and the programmable controller.

14. An automatic station identification system comprising:
a) a common data bus for electrically conducting information;
b) control lines for electrically conducting control signals;
c) a programmable controller adapted to access the common data bus and the control lines for transmitting and receiving address information on the serial bus and control signals on the control lines;
d) a plurality of programmable function modules including a first programmable function module electrically interconnected to the programmable controller by a first control line, each programmable function module thereafter electrically interconnected in a point to point fashion with the first control line, a last programmable function module electrically interconnected to the programmable controller with a second control line, each programmable function module adapted to access the common data bus for transmitting and receiving information;
e) the programmable controller programmed to transmit predetermined address information on the common data bus, to transmit an enabling signal on the first control line to the first programmable function module, and to receive final address identification information from the last programmable function module on the second control line; and
f) each programmable function module of the plurality of programmable function modules programmed to receive the enabling signal from the first control line, access the common data bus to receive the address information, assign itself a unique address as determined by the address information, modify the address information in a predetermined manner, return the modified address information to the common data bus, and transmit the enabling signal to an adjacent programmable function module, if electrically connected to an adjacent function module by a loopback signal circuit separate and distinct from the common data bus and the first control line, or to the programmable controller if not electrically connected to an adjacent function module by the loopback signal circuit.

* * * * *

UNITED STATES PAPATENT AND TRADEMARK OFFICE
CERTIFICATE OF CORRECTION

PATENT NO. : 5,204,669

DATED : 04/20/93

INVENTOR(S) : Steven G. Dorfe et al.

It is certified that error appears in the above-identified patent and that said Letters Patent is hereby corrected as shown below:

In Column 13, line 17, Claim 1, "$f_6[1]$" should read --F[1]--.
In Column 13, line 18, Claim 1, delete "[first]" after the word "the".
In Column 13, line 20, Claim 1, delete "[first]" after the word "the".
In Column 13, line 21, Claim 1, "-F-[TOTAL]" should read -- -F[TOTAL] --.
In Column 13, line 32, Claim 1, "wall" should read --way--.
In Column 14, line 9, Claim 7, "fiber" should read --number--.
In Column 14, line 50, Claim 9, insert --the-- before "programmable".

Signed and Sealed this

Eighteenth Day of April, 1995

*Attest:*

BRUCE LEHMAN

*Attesting Officer*   *Commissioner of Patents and Trademarks*